Feb. 1, 1955      A. HORNELL      2,701,150

SEAL FOR ROTATABLE MEMBERS

Filed Oct. 7, 1950

Inventor

Alex Hornell

By Richmond S. Hayes

Attorney

United States Patent Office 2,701,150
Patented Feb. 1, 1955

2,701,150

SEAL FOR ROTATABLE MEMBERS

Alex Hornell, Jamestown, N. Y., assignor, by mesne assignments, to Saywell Associates, a joint venture, South San Francisco, Calif.

Application October 7, 1950, Serial No. 188,995

1 Claim. (Cl. 286—11)

This invention relates generally to improvements in seals for bearings and other relatively rotatable concentric members.

More particularly, the invention is directed to a seal in the form of a thin metal annulus in conjunction with means for securing it in a structure such as a unitary type bearing. Such a bearing mounts a shaft within some form of sleeve through the use of balls or rollers that are confined to cooperating raceways created in the sleeve and shaft. In the present disclosure of the invention a single, thin, metal annulus is intended to bridge and seal the space between the relatively rotatable members of a bearing by engagement of the inner and outer peripheries thereof with appropriate surfaces on said members. The securing means takes the form of a locking ring which engages and fixes the annulus with respect to one of said members and allows relatively rotatable sealing contact with the other of said members.

Prior to this invention, metal annuluses have been utilized for the purpose of sealing lubricant in unit as well as other bearing assemblies. In many such bearings the relatively rotatable parts attain high speed and it has been found that the lubricant in such bearings tended to build up sufficient pressure to work its way past the seal to such an extent that insufficient lubricant remained confined to prevent undesirable wear or complete breakdown. The inefficiency of such annuluses as lubricant seals is not due necessarily to the construction of the annulus itself but, rather to the form which the annulus assumes upon being secured in place. Annuluses of the type considered in the present instance are formed from extremely thin spring metal and are therefore highly subject to distortion. This distortion may take the form of warping or bending in one direction or another, wrinkling, or stretching, depending on the particular means and method employed to lock or secure them in place. Thus, although an annulus may be properly formed from desired thickness spring metal, and the surfaces of the bearing parts with which it is to contact may have been accurately finished, it is not only possible, but frequently occurs that, upon installation, the locking member has so distorted the annulus that it fails as a positive seal against egress of lubricant from the interior of the bearing.

It is contemplated that through the provision of properly designed means, a metal annulus may be so secured or locked in a bearing or other similar assembly as to provide a positive lubricant seal under all operative conditions. To this end the present invention is primarily directed to the use of a thin metal annulus and a locking ring for securing said annulus in positive sealing position and to the method of installing such a locking ring without undesirable or appreciable distortion of said annulus.

Another object of the invention lies in the provision of a locking ring that, when installed, not only secures one periphery of the annulus against rotation or displacement with respect to one bearing member, but also effects uniform sealing contact of the other periphery of the annulus with a surface of the other member of the bearing.

A further object of the invention lies in the provision of a locking ring that is of simple design, easily produced, and may be installed through the use of mechanism provided for this purpose.

A further and most important object of the invention lies in the provision of a locking ring which, during the process of installation, exerts an expanding friction on one periphery of the annulus to produce slight radial enlargement, and by means of which wrinkling or other undesirable distortion of the annulus is prevented.

Other objects and advantages of the invention will be more fully understood from a consideration of the following specification, taken in conjunction with the accompanying drawing, in which:

Fig. 1 is a side elevational view of a unitary type bearing in which one form of the invention is embodied;

Fig. 2 is an edgewise view, partly in section, showing the position of the sealing annuluses and locking rings with respect to the relatively rotatable parts of the bearing;

Figure 4:
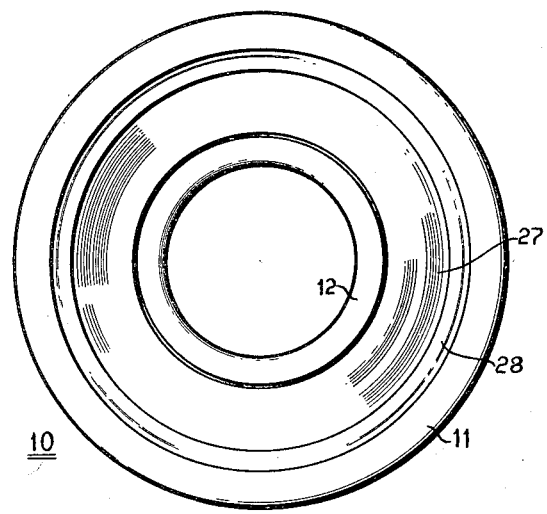
Fig. 4 is a view of the bearing similar to Fig. 3 and shows the first step of installing the locking ring.

Referring more particularly to the drawing, the reference numeral 10 is employed to generally designate a bearing of the unitary type in which lubricant seals and locking rings embodying one form of the invention are mounted. The bearing shown includes outer and inner rings 11 and 12, respectively. Suitable balls 13 are adapted to move in recesses 14 and 16 of the rings. These balls are held in spaced relationship in the recesses by means of a retainer 17. The arrangement of bearing rings, recesses, balls and retainer are considered to be common practice. The present illustration of the bearing shows the balls 13 and retainer 17 to be exposed on two sides of the bearing and, therefore, such a bearing will be provided with two lubricant seals and two locking rings for holding the seals in place. Inasmuch as the seals and locking rings are identical, except for their reverse position, only one of each will be described in detail.

The outer ring 11 is formed with a marginally located annular recess 18 that radially faces the inner ring 12. One side of this recess has an inclined wall 19 that blends with a shoulder 20 at the ring edge 21. The other side of the recess extends radially inwardly of the bearing, providing a face 22 that terminates at the ring bore 23. The inner ring 12 is formed with an annular marginal face 24 that is inclined inwardly of the bearing from shoulder 25 to the outer periphery 26 of this ring. The face 24 is slightly displaced axially outwardly with respect to the face 22.

Figure 3:
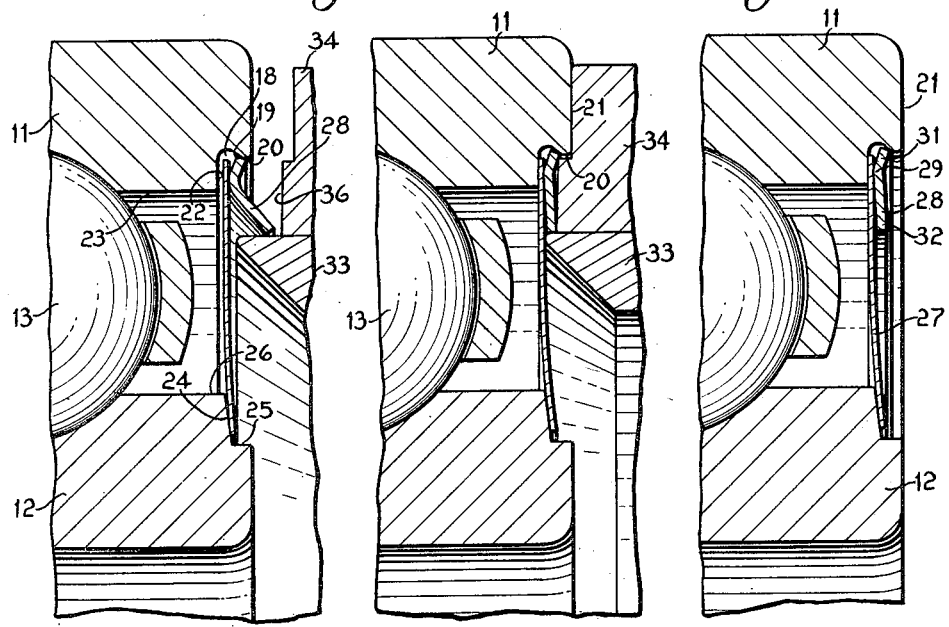
Fig. 3 is an enlarged fragmentary sectional view of a portion of the bearing shown in Fig. 2 and shows the annulus held in sealing engagement with the bearing rings by means of an expanded locking ring.

The seal constituting part of this invention is formed from a thin spring metal annulus 27 and is adapted to be mounted with the inner face of its outer periphery in contact with the face 22 of the outer ring 11, and the inner face of the inner periphery in contact with the face 24 of the inner ring 12. A locking ring 28 is intended to secure this annulus in fixed and sealing engagement with the outer ring 11, and sealing contact with the inner ring. This ring has an annular intermediate ridge 29 that is formed by the juncture of annular flanges 31 and 32. The outer flange 31 extends into the recess 18, the periphery thereof abutting the inclined wall 19. As indicated in Fig. 3, flange 31 has such angular contact with wall 19 that it exerts sufficient lateral pressure of the ridge 29 on the annulus to maintain said annulus in fixed sealing contact with the face 22 of the ring 11. The inner flange 32 is proportioned to give strength to the ring and serves the important purpose of shaping and fitting the ring into the bearing during the assembly operation. It will be noted that flanges 31 and 32 have a near right angle relationship in the original form of the ring and become straightened out to a considerable extent when the ring is mounted and locked into place in the bearing.

As has already been brought out, it is considered most important to the successful mounting of the sealing annulus that the locking means therefor be of such form and so installed that the annulus will not be distorted in a manner or to an extent to impair the effectiveness of the sealing contact. With this in mind, assembly of the annulus 27 and ring 28 with the bearing is set out as follows: The annulus 27 is first placed in the opening between the rings. The face 24 of the inner ring being located axially outwardly of the face 22, the annulus will, when initially inserted, rest only against face 24. The ring 28 has an outer diameter slightly greater than the diameter of the opening defined by the shoulder 20 and thus this ring must be snapped into the outer bearing ring and will occupy the position shown in Fig. 4. Herein it will be noted the ridge 29 of this ring bears against the annulus, deflecting it slightly in the direction of, but not into contact with, the face 22. The peripheral edge of the locking ring bears against the outer portion of the inclined wall 19. Of course the angularity of the locking ring flanges is very pronounced and, although the flange 31 thereof is located within the lateral limits of the recess 18, flange 32 extends well beyond the edge of the bearing.

Figure 5:
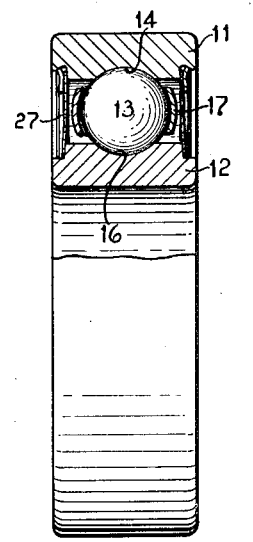
Fig. 5 is a view similar to Fig. 4 showing the locking ring fully expanded into engagement with one bearing ring and the annulus.

A two-part tool is now employed to seat the annulus and expand the ring into locking position. This tool includes a pair of telescoping members capable of relative axial movement along the axis of rotation of the bearing. One member takes the form of a tube 33 which has an outer diameter considerably less than the bore of the ring 11. The diameter of this tube is also slightly less than the diameter of the opening in the locking ring as defined by the edge of flange 32. Another member of the tool consists of a cylinder 34 that is formed with an annular end ledge 36, the outer diameter of this ledge being slightly less than the diameter of the opening formed by the shoulder 20. The members of the tool are intended to initially occupy the relative positions shown in Fig. 4. The tool, in its entirety, is moved toward the bearing to bring the tube 33 into the opening between the rings, the outer surface of the tube being in near proximity with the flange 32 of the locking ring. Following predetermined movement of the tube 33, the cylinder 34 is advanced, bringing the ledge 36 into contact with the exposed flange 32 of the locking ring. Continued advancement of the cylinder 34 straightens this flange to an extent that it contacts the tube 33. At this intermediate point in the assembly operation, the angularity of flanges 31 and 32 is less pronounced, and the ridge 29 has moved the annulus into proximity with the face 22. Of course, upon continued axial movement of the cylinder 34, the flange 32 is further straightened and the ring, in its entirety, is radially expanded, with the outer flange 31 moving inwardly along the wall 19 toward the base of the recess 18. When the end of the cylinder 34 abuts the face 21 of the bearing ring 11, ledge 36 will have moved the locking ring into the position shown in Fig. 5, wherein the flanges of this ring have been considerably straightened and the ring has been expanded to have a tight fit with the inclined wall 19. The tool may now be removed.

Attention is particularly directed to the fact that as the tool straightens the flanges of the locking ring, it also causes radial expansion of said ring and, of course, such radial expansion causes the ridge 29 to radially expand. Inasmuch as this ridge has pressure contact with the annulus, the annulus is also slightly radially expanded as it is brought into pressure contact with the face 22. In its locked position, the annulus is slightly dished in cross section, due to the axial difference in location of faces 22 and 24. Thus the annulus has spring-like contact with the face 24 and effects an excellent seal as between these relatively moving parts. It is pointed out that the slight springing of the annulus, during the operation of locking it in place, has no undesirable distorting effect by reason of the fact that the annulus, in its entirety, is slightly radially expanded.

Although applicant has shown and described only one form of sealing annulus and one particular shape of locking ring, it will be apparent that without change as between the contacting portions of the annulus and locking ring, both of these parts may otherwise be modified without in any way departing from the spirit and scope of the invention as set out in the annexed claim.

Having thus set forth my invention, what I claim as new and for which I desire protection by Letters Patent is:

The lubricant sealing assembly for a pair of relatively rotatable inner and outer concentric members, each of said members having a laterally directed annular face formed on the same, the outer member having an inwardly faced recess having an inclined wall which forms the inner surface of an annular lip on the outer member, a thin spring metal annulus having its inner and outer margins in contact with said faces, and a sheet metal locking ring of uniform thickness having its outer peripheral edge abutting the inner surface of the said lip to thereby provide an axially directed clamping force, and having a bent annular portion intermediate its outer and inner edges which engages and presses axially against the outer margin of the spring metal annulus to thereby seat the said annulus against the corresponding face, said metal locking ring having an inner portion in a plane substantially perpendicular to the axis of said member and the portion beyond said intermediate portion forming an acute angle with said plane.

References Cited in the file of this patent

UNITED STATES PATENTS

| | | |
|---|---|---|
| 2,208,700 | Murden | July 23, 1940 |
| 2,237,616 | Smith | Apr. 8, 1941 |
| 2,251,012 | Delaval-Crow | July 29, 1941 |
| 2,320,794 | Pew | June 1, 1943 |
| 2,428,041 | Saywell | Sept. 30, 1947 |
| 2,600,434 | Saywell | June 17, 1952 |

FOREIGN PATENTS

| | | |
|---|---|---|
| 526,125 | Great Britain | of 1940 |
| 580,435 | Great Britain | of 1946 |